May 17, 1949.

C. E. ADAMS 2,470,087

EXPANSIBLE CHAMBER HYDRAULIC MOTOR
WITH DISTRIBUTING VALVE IN PISTON

Filed Dec. 14, 1944

INVENTOR.
Cecil E. Adams
BY
Herschel C. Omohundro

May 17, 1949.

C. E. ADAMS 2,470,087

EXPANSIBLE CHAMBER HYDRAULIC MOTOR
WITH DISTRIBUTING VALVE IN PISTON

Filed Dec. 14, 1944

INVENTOR.
Cecil E. Adams
BY
Herschel C. Omohundro

Patented May 17, 1949

2,470,087

UNITED STATES PATENT OFFICE 2,470,087

EXPANSIBLE CHAMBER HYDRAULIC MOTOR WITH DISTRIBUTING VALVE IN PISTON

Cecil E. Adams, Columbus, Ohio, assignor to The Denison Engineering Company, Columbus, Ohio, a corporation of Ohio Application December 14, 1944, Serial No. 568,139

23 Claims. (Cl. 121—123)

This invention relates generally to power units or fluid motors and is particularly directed to devices which are responsive to fluid pressure to effect reciprocation of an element such as a ram, a punch, a riveting die, a chisel or any other element.

One object of the invention is to provide a power unit which will develop reciprocatory motion and which will be self-contained, in that substantially all valves, flow reversing means, fluid passages, etc., will be contained in one casing which may be connected with a line leading from a source of fluid at a controlled maximum pressure, and the unit operated without the addition of other mechanism.

Another object of the invention is to provide a power unit having a body with a chamber in which a piston is adapted to move, the piston containing automatic valve mechanism which is operative to alternately direct fluid pressure to the opposite ends of the piston and thus cause back and forth movement thereof.

Another object of the invention is to provide a fluid operated power unit or motor having a body containing a reciprocatory piston which in turn contains a valve mechanism, the piston having a number of passages formed therein and operating as a part of the valve mechanism whereby fluid will be directed along the paths necessary to effect the desired movement of the piston, a portion of the valve mechanism in the piston being moved by fluid pressure to certain flow directing positions.

An object of the invention is to provide a fluid motor of the piston and cylinder type which is capable of reciprocating an element over a predetermined distance when the resistance offered is less than the force applied to move the piston and when such resistance is equal to the force moving the piston in a forward direction the piston will be stopped and caused to move rearwardly even though the predetermined distance has not been traversed.

A further object of this invention is to provide a hydraulic actuating device having a body containing a reciprocatory piston and automatic valve mechanism for so directing the hydraulic fluid as to cause the piston to alternately move in opposite directions, the body being provided with means for changing the length of travel or stroke of the piston from no motion to a predetermined maximum motion limited only by the size of the device and the uses to which it is to be placed.

An object of the invention also is to provide a hydraulic power unit or motor having a piston disposed for reciprocatory movement and a pressure operated flow control mechanism for properly directing the fluid under pressure to effect the movement of the piston, valve means being so associated with the piston as to admit fluid to the control mechanism to cause it to assume a position wherein the path of fluid flow will be changed to reverse the direction of movement of the piston after it has reached a certain position in its travel.

Another object is to provide the valve means, mentioned in the preceding paragraph, with means for effecting the adjustment thereof whereby the position of the piston at which the valve causes a reversal thereof will be changed to give the piston more or less travel as required.

An object of this invention is to provide a reciprocating piston motor having valve means for controlling the direction of movement of the piston which valve means has a minimum number of moving parts, is constantly exposed to a force tending to move the same toward one flow establishing position and is intermittently moved in opposition to such force by another force of greater magnitude to another flow establishing position, the constant application of force resulting in rapid reversing action of the valve and a marked decrease in the time interval between initiation and completion of the reversal of direction of movement of the piston.

In some prior devices of this general character pressure reversal is employed; in these devices the valve for controlling the direction of movement of the piston is actuated by fluid pressure built up in the piston chamber. In some instances the control valve may in turn be controlled by a pilot valve which moves in response to fluid pressures built up in the piston chamber. In either case, the application of fluid pressure to effect the movement of these valves is governed by spring-pressed elements which must be adjusted to open at a pressure below that for which the main relief valve in the system is set. With such an arrangement a careful adjustment of such valves is necessary for a proper operation of the device and each valve, i. e., the relief and spring-pressed valves, must be so set relative to the other that the proper pressure will be developed in the piston chamber before a reversal of direction of travel occurs. It is essential in such an arrangement that the spring-pressed elements which control the flow governing valve be free from leakage from any cause otherwise the reversal of the piston may take place prior to the desired or required time, and cause damage to the mechanism and injury to the workmen. Such a combination of elements therefore required continuous service to maintain the fine adjustments. Also, due to the number of working parts, and method of operation the length of time elapsing between the start and completion of the reversing operation is such as to permit the fluid pressure to build up whereby the force exerted by the piston may be greater than that desired. Further, the time required to reverse may vary and consequently change the force exerted by the piston. It is an object of this invention to avoid the above objections by providing a simple one piece valve which altho moved in one direction by fluid pressure, is controlled by the position of the piston in one stage of its travel and by the movement thereof in another stage, the main relief valve or some equivalent device only being necessary to secure the predetermined force on the piston. The predetermined force may then be varied solely through the adjustment of the main relief valve.

It is also an object of the invention to provide a fluid motor of the reciprocating type which is provided with means to absorb the shocks transmitted to the various parts when the piston is permitted to travel the maximum distance for which the device has been adjusted.

A further object of the invention is to provide a fluid motor having a piston disposed for reciprocatory movement in a cylinder and valve means for controlling the admission and discharge of fluid to and from the cylinder to effect the movement of the piston, the valve means or other cooperative elements being so formed and operated as to gradually diminish the flow of fluid from the ends of the cylinder toward which the piston is moving so that the piston will lose momentum slowly and reverse its direction of movement without contacting the end walls of the cylinder. In this manner, sudden shocks will be avoided, the mechanism will be protected against undue wear and the active life of the device thereby prolonged.

Further objects and advantages of the present invention will be apparent from the following description, reference being had to the accompanying drawings wherein a preferred form of embodiment of the invention is clearly shown.

Figure 1:
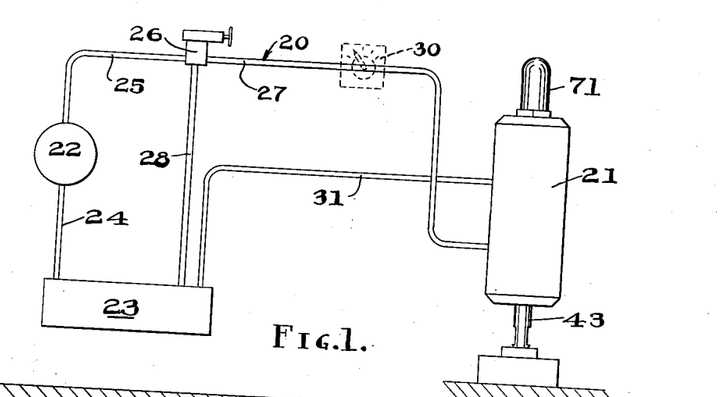
Fig. 1 is a diagrammatic view of a hydraulic system in which a fluid motor formed in accordance with the invention has been incorporated.

Referring more particularly to the drawing, the numeral 20 designates the hydraulic system generally. This system has a fluid operated motor 21 formed in accordance with the invention, a power operated pump 22 for supplying fluid underpressure to the motor 21 and a reservoir 23 for receiving fluid at atmospheric pressure, after it has been discharged from the motor 21. The pump 22 communicates with the reservoir through a line 24 through which fluid is drawn by the pump during its operation. This fluid is discharged by the pump through line 25 to a relief valve 26 and from this member through a line 27 to the motor 21. The relief valve may be of a conventional type which is set to by-pass fluid from the line 25 through a line 28 to the reservoir 23 when the pressure in the line 25 exceeds a predetermined maximum. If desired, the line 27 may be provided with a volume control 30, indicated by dotted lines in Fig. 1, by which the speed of operation of the motor 21 may be controlled. An alternative control may be secured by employing a variable volume pump in which case the volume control 30 would be omitted. A line 31 extends from the motor 21 to the reservoir 23 to conduct fluid exhausted from the motor to the reservoir. It should be obvious that, if desired, an accumulator, not shown, could be used in the system to store up fluid underpressure to effect the operation of the motor 21.

Figure 2:
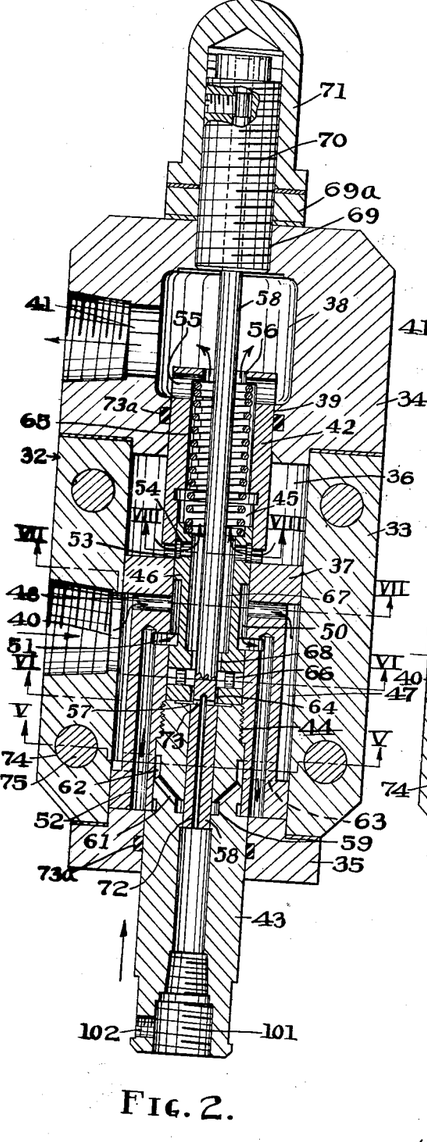
Fig. 2 is a vertical longitudinal sectional view taken through the fluid motor shown in Fig. 1, the parts of the fluid motor being disposed in an extended position.
Figure 3:
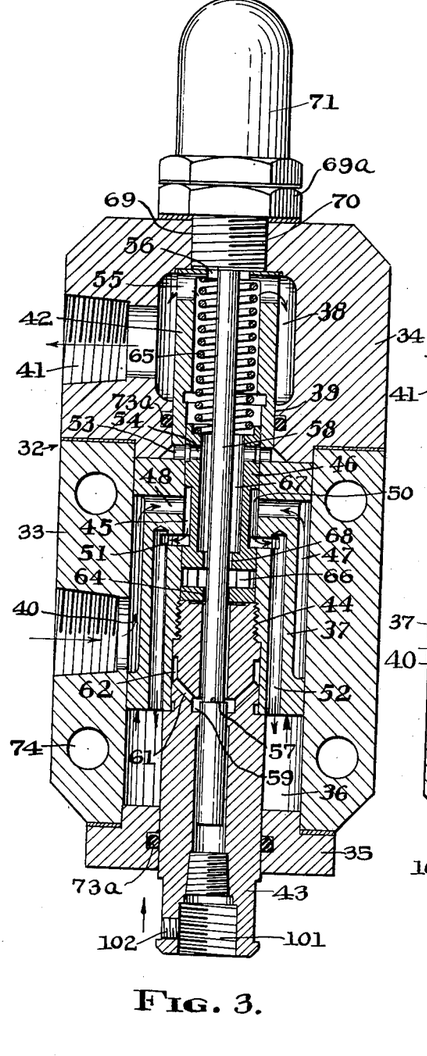
Fig. 3 is a similar view showing the parts of the motor in a fully retracted position.
Figure 4:
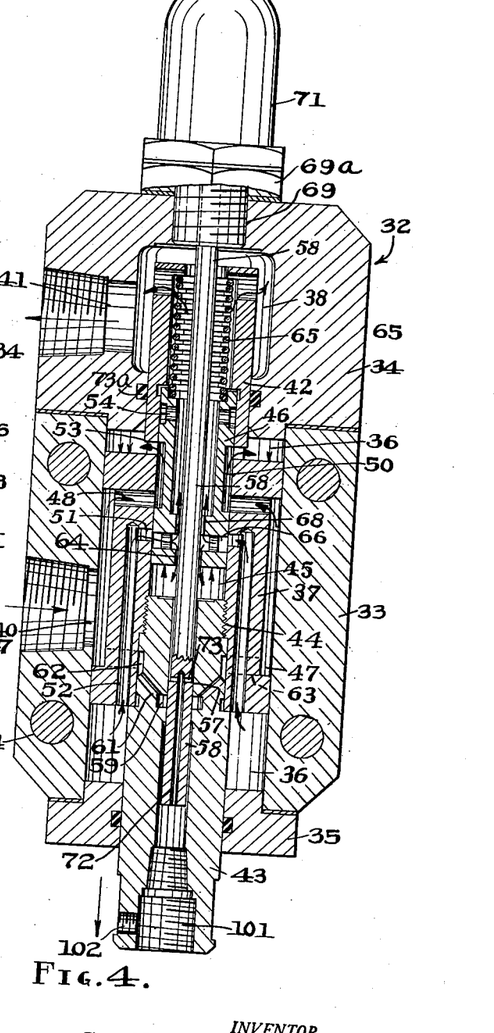
Fig. 4 is also a similar view showing the parts in an intermediate position, during the movement thereof from a retracted to an extended position.
Figure 5:
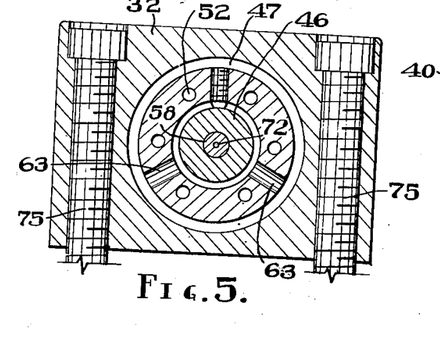
Figs. 5 to 8 inclusive, are detailed horizontal sectional views taken through the motor on the planes indicated by the lines V—V, VI—VI, VII—VII and VIII—VIII respectively in Fig. 2.
Figure 6:
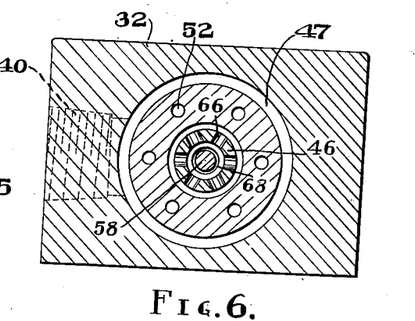
Figure 7:
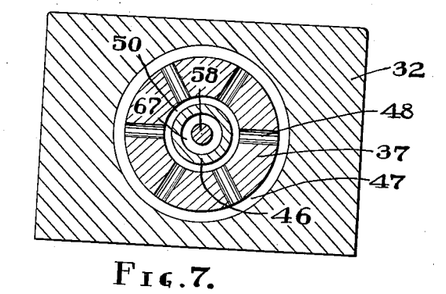
Figure 8:
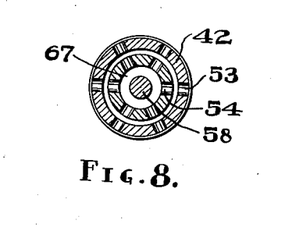

As illustrated in Figs. 2, 3, and 4 the motor 21 includes a casing 32 having a body section 33, a head 34, and a cap 35, the latter closing the open lower end of the body 33. The body 33 has an internal chamber 36 for the reception of a piston 37. The head 34 also has a chamber 38 which communicates by way of a reduced bore 39 with the chamber 36 in the body. Body 33 is provided with an inlet port 40 which communicates with the line 27 and through which fluid under pressure from the pump is supplied to the chamber 36. The head 34 has an outlet port 41 which is connected to the line 31 leading to the reservoir 23.

In the operation of the motor 21, the fluid introduced to the chamber 36 is alternately directed to opposite ends of the piston 37 to effect reciprocation thereof in the casing 32. As this piston moves back and forth, fluid is forced from the casing through the port 41 and line 31 to the reservoir. The direction of flow of oil is controlled by the position of the piston and valve mechanism carried thereby.

The piston 37 includes an extension 42 at one end, which projects from the chamber 36 through the reduced bore 39 and into the chamber 38 formed in the head 34. At the opposite end, the piston has a rod 43 secured thereto by a threaded engagement 44. The piston 37 is also provided with an internal chamber 45 for the slidable reception of a shuttle valve 46 which as previously mentioned, assists in controlling the direction of flow of fluid through the device. As fluid flows through the port 40 into the chamber 36 it is confined in an annular groove 47 formed in the external surface of the piston 37. This annular groove is connected by radial passages 48 with the chamber 45 in the piston. The shuttle valve 46 also has an annular groove 50 which serves when the shuttle valve is in the position shown in Fig. 2, to connect the inner ends of the passages 48 with an internal groove 51 formed in the piston. This groove intersects the inner ends of a plurality of passages 52 which extend longitudinally of the piston 37. The outer ends of these passages open to the lower end of the chamber 36 in the casing 32.

When the parts of the motor are in the position shown in Fig. 2, fluid under pressure introduced to the chamber 36 flows through the groove 47, passages 48, grooves 50 and 51 and passages 52 to the lower end of the chamber 36 below the piston. The force of this fluid is exerted on the piston and tends to move it upwardly. During this upward movement, fluid will flow from the upper end of the chamber 36 through lateral ports 53 formed in the piston extension, and through matching ports 54 formed in the shuttle valve 46. This fluid flows through the interior of the piston extension and out through openings 55 and 56 provided in the upper end of the piston extension into the chamber 38 from which it flows through port 41 and line 31 to the reservoir 23.

After the piston has moved to the limit of its upward travel a shoulder 57 formed on a valve stem 58 reaches an internal groove 59 formed in the piston rod 43. This groove is connected by angular passages 61 with an external groove 62 provided on the rod 43 which groove is disposed within the piston and is in communication through passages 63, with the groove 47. When the shoulder is so positioned fluid underpressure may flow from the groove 47 through the passages 63, groove 62, passages 61 to the groove 59. This fluid may then flow through the open center of the piston rod 43, around the valve stem 58 to the interior of the piston at the lower end of the shuttle valve 46. The flow of fluid from this space is so retarded that pressure will be built up under the shuttle valve. This pressure will exert force on the shuttle valve causing it to move upwardly, in opposition to the force of the coil spring 65, to the position shown in Fig. 4 wherein groove 50 will then connect the inner ends of the passages 48 with the ports 53.

When the parts are in this position fluid under pressure will flow into the upper end of the chamber 36 and exert a downward force on the piston. The piston will then move toward an extended position and fluid will flow from the lower end of the chamber 36 into the passages 52, groove 51, lateral passages 66 formed in the shuttle valve and through the hollow interior 67 of the shuttle valve to the interior of the piston extension from which it will flow through ports 55 and 56 to the chamber 38. The shuttle valve is provided with a restricted opening 68 between the inner ends of the ports 66 and the interior 67 so that fluid being discharged from the lower end of the chamber 36 will be under a back pressure which will be transmitted through the restricted opening 64 to the space below the shuttle valve. This fluid pressure will exert a force on the lower end of the shuttle valve and hold the same in its elevated position against the force of the spring 65. As long as the piston is moving toward an extended position and fluid is being discharged from the lower end of chamber 36, the back pressure will be maintained and the shuttle valve will be held in elevated or spring compressing position.

As long as the shuttle valve is in this position fluid pressure will be directed to the upper end of the chamber 36 and exert a downward force on the piston. When in its downward movement, the piston meets a resistance equal to the force tending to cause such movement, which force is determined by the setting of the relief valve 26 or the maximum pressure of an accumulator where used, such downward movement will terminate. At this time the piston of the fluid motor will be exerting its maximum or a predetermined force on the tool or other machine element connected therewith. Since, however, the piston has discontinued moving, the flow of fluid from the lower end of the chamber 36 will also cease and the back pressure in the passages 66 will fall due to the escape of fluid through the openings 68, 67, the interior of the piston extension and openings 55 and 56 to outlet port 41 and tank 23. The spring 65 will then cause the fluid to bleed from the space beneath the shuttle valve and the latter element will return to its lowered position, shown in Fig. 2, wherein the fluid under pressure will be supplied to the lower end of the piston to cause it to move upwardly.

In the event, the piston or element moved thereby, does not in its downward movement meet a resistance equal to the force causing such movement, the piston will engage the end wall of the casing which will prevent further movement; the flow of fluid from the lower end of the chamber 36 will then be discontinued and the shuttle valve will reverse its position, as above described to direct fluid under pressure to the under side of piston 37 to urge it in an upward direction.

When the piston again approaches the upward limit of its travel, the shuttle valve 46 will be moved in opposition to the spring 65 as previously described, to cause the piston 37 to again move downwardly. Reciprocation of the piston will be continued as long as fluid under pressure is supplied to the port 40.

In the operation of the device, it may be found desirable to vary the length of travel of the piston 37. To secure this modified operation, the upper end of the head 34 is formed with a threaded opening 69 to receive an adjusting screw 70. This screw carries the valve stem 58 and holds it in the desired position of adjustment. The upper end of the screw is formed to receive a tool, not shown, employed to change the setting of the valve rod and consequently the length of travel of the piston. The screw receives a threaded acorn cap 71 and lock nut 69a to prevent accidental or undesired movement of the screw and the escape of fluid around the same. The lower end of the valve stem 58 is slightly larger in diameter than the remaining portion thereof and closely fits the bore in the piston rod 43 so that when the piston 37 starts its downward or outward movement the shoulder 57 on the valve stem will cut off the flow of fluid under pressure from the groove 59 to the under side of the shuttle valve. It should be obvious that when the valve stem is adjusted to decrease the distance between shoulder 57 and groove 59 the length of travel of the piston will be shortened. Although this flow is discontinued the back pressure on the fluid flowing from the underside of the piston through passages 52, groove 51, passages 66, and opening 68 is sufficient to maintain the shuttle valve in its uppermost position. As shown in Figs. 2 and 4 the lower end of the valve stem has a longitudinally extending passage 72 which connects at its inner end with a lateral passage 73, these passages serving to permit the escape of fluid from the interior of the piston rod when the valve stem is moving thereinto during the upward movement of the piston.

Packing rings 73A of the flexible O ring type are employed in the body around the piston rod 43 and the piston extension 42 to prevent the escape of fluid under pressure when the motor is in operation. The body 33 has a plurality of holes 74 formed therein to receive bolts or other fastening devices 75 employed in securing the motor to a suitable support.

The normal operation of the device is as follows assuming the piston is in a retracted position: Fluid under pressure is supplied to inlet port 40 of the motor. This fluid flows through groove 47, passages 48, grooves 50 and 51 and passages 52 to the lower end of the chamber 36. The piston 37 is moved upwardly by the force of this fluid until the shoulder 57 reaches the groove 59. Fluid under pressure then flows from this groove through the piston rod 43 and around the valve stem 58 to the underside of the shuttle valve causing this member to move upwardly till the groove 50 therein connects the passages 48 with the ports 53 which lead to the upper end of the chamber 36 and fluid is then supplied to this end of the chamber.

The admission of fluid under pressure to the upper end of the chamber 36 causes the piston to move downwardly and the fluid forced from the lower end of the chamber 36 by the downward movement of the piston serves to hold the shuttle valve in its upper position due to the back pressure created by the restricted flow of fluid through the opening 68. When the piston stops moving this flow will be discontinued and the shuttle valve will be returned to a lowered position wherein fluid under pressure will be directed to the lower end of the piston to initiate another cycle of operation.

Figure 9:
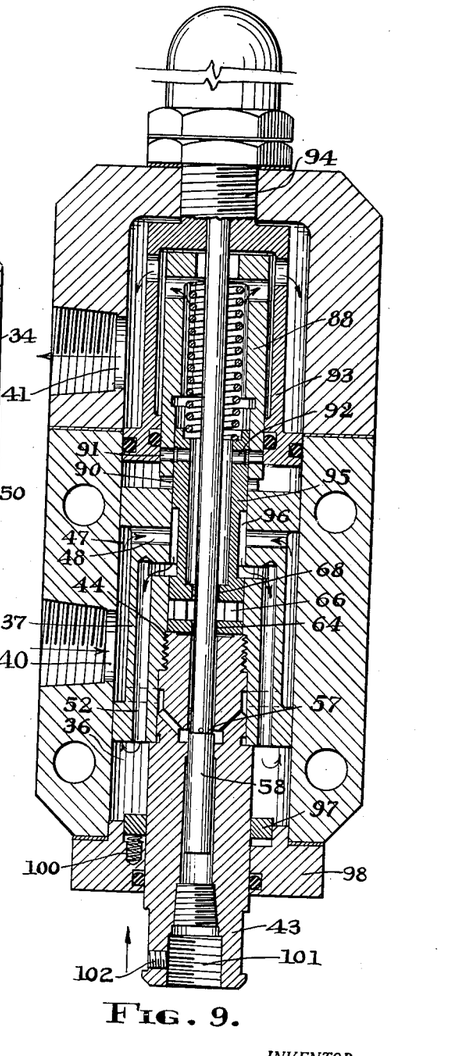
Fig. 9 is a vertical longitudinal sectional view taken through a modified form of motor.

In the modified form of the invention shown in Fig. 9, the device has been provided with means for absorbing the shock ordinarily imparted to the ends of the chamber 36 or other stop means by the engagement of the piston therewith as in the form of the invention first described. In this form of motor, means are provided to gradually reduce the rate of flow of fluid from each end of the cylinder as the piston moves toward that end, the flow being completely cut off before the piston can engage the end wall. By so discontinuing the flow of fluid, the piston is caused to lose momentum slowly and reverse its direction of movement without shock.

To accomplish this result at the end of the inward movement, the piston extension 88 is provided with two longitudinally spaced sets of lateral ports 90 and 91 which in this instance are round. The ports 91 register with ports 92 in the shuttle valve when the latter is in a lowered position and these registering ports serve to connect the inner end of the chamber 36 with the passages leading to the reservoir to permit fluid to escape by this route when the piston is moving in an upward direction. When during the upward movement of the piston, the round ports 91 begin to pass the lower edge of a skirt 93 carried by the adjusting screw 94, the flow of fluid from the chamber through the ports 91 and 92 will be gradually cut off until it and the motion of the piston is completely stopped when the lower edges of the openings 91 pass that of the skirt 93. At this time the shoulder 57 will have reached the groove 59 and fluid pressure will be directed against the shuttle valve 95 to move the same to a position to direct fluid from the ports 48 through groove 96 and ports 90 to the upper end of the cylinder 36.

The force of the fluid thus admitted will cause the piston to move downwardly. As it approaches the limit of its downward travel, the bottom surface of the piston moves closer to a valve ring 97 resiliently supported in the cylinder end cap 98 by springs 100. As the piston surface nears the ring 97, the flow of fluid from the chamber 36 into the passages 32 will be gradually decreased until, when the ring contacts the surface, it will be discontinued. As the fluid flow from the chamber 36 decreases, the rate of movement of the piston will also decrease and when the flow stops the movement of the piston will also stop. At this time, the back pressure in passages 52 and 66 and in the space below the shuttle valve will fall, due to the bleeding of fluid through openings 64 and 68 as previously described, and the spring 65 will return shuttle valve to the position wherein fluid is conducted under pressure to the lower end of the chamber 36.

In this form of the invention, the skirt 93 is adjusted simultaneously with the adjustment of the valve shoulder 57.

In both forms of the invention, the lower outer end of the piston rod 43 is provided with a threaded socket 101 to receive a suitable tool or other article, this device being retained by a set screw 102 extending laterally through one wall of the piston rod. It will be apparent from the foregoing that a fluid motor has been provided which will produce reciprocatory movement of any desired element. The device can be employed anywhere such movement is desired being particularly adaptable for use on conveyers, rock crushers, rock drills, riveting devices, stamping machines and other analogous articles.

While the form of embodiment of the present invention as herein disclosed constitutes a preferred form, it is to be understood that other forms might be adopted, all coming within the scope of the claims which follow:

I claim:

1. A fluid pressure energy translating device comprising a body having a chamber with inlet and outlet ports; a piston disposed for movement in said chamber, said piston having an internal compartment and passages extending from said compartment to said inlet and to the opposite ends of said piston; flow control means in said compartment, said flow control means being movable between separate positions in which communication is established between the inlet and one or the other end of said piston; valve means operative when said piston is in one position of movement to direct fluid pressure from said inlet against said control means to move the same to a certain position wherein fluid is conducted to one end of said piston; means for applying some of the fluid displaced by the opposite end of said piston while the same is moving in response to the application of fluid to the first end thereof to said control means to retain the same in said certain position; and means tending to move said flow control means to a position to direct fluid to the opposite end of said piston when said valve means is inoperative.

2. A fluid pressure energy translating device comprising a body having a chamber with inlet and outlet ports; a piston disposed for movement in said chamber, said piston having an internal compartment and passages extending from said compartment to said inlet and to the opposite ends of said piston; flow control means disposed in said compartment for movement between a pair of positions, said flow control means having a plurality of ports arranged to alternately connect the passages extending to the ends of said piston with said inlet and outlet ports when said control means is in said positions; means tending to urge said flow control means toward one position of movement; means operative when said piston is in a certain position of movement to direct fluid from said inlet against said control means to move the same in opposition to said urging means whereby fluid at inlet port pressure will be directed to one end of said chamber to cause said piston to move in a certain direction; and passage means for applying some of the fluid flowing from the opposite end of said chamber to said control means to hold the same against movement by said urging means.

3. A fluid pressure energy translating device comprising a body having a chamber with inlet and outlet ports; a piston disposed for movement in said chamber, said piston having an internal compartment and passages extending from said compartment to said inlet and to the opposite ends of said piston; flow control means disposed in said compartment for movement between a pair of positions, said flow control means having a plurality of ports arranged to alternately connect the passages extending to the ends of said piston with said inlet and outlet ports when said control means is in said positions; means tending to urge said flow control means toward one position of movement; flow directing means operative when said piston is in a certain position of movement to direct fluid from said inlet against said control means to move the same in opposition to said urging means to a position to direct fluid at inlet port pressure into one end of said chamber to cause said piston to move in a certain direction; means forming a fluid passage to direct a portion of the fluid flowing from the opposite end of said chamber against said control means to hold the same against movement by said urging means; and means for varying the position of movement of said piston in which said flow-directing means becomes operative.

4. A fluid pressure energy translating device comprising a body having a chamber with inlet and outlet ports; a piston disposed for movement in said chamber, said piston having an internal compartment and passages extending from said compartment to said inlet and to the opposite ends of said piston; flow control means disposed in said compartment for movement between a pair of positions, said flow control means having a plurality of ports arranged to alternately connect the passages extending to the ends of said piston with said inlet and outlet ports when said control means is in said positions; means tending to urge said flow control means toward one position of movement; flow-directing means operative when said piston is in a certain position of movement to direct fluid from said inlet against said control means to move the same in opposition to said urging means to cause fluid at inlet port pressure to be directed to one end of said chamber to cause said piston to move in a certain direction; means for applying a portion of the fluid being discharged from said chamber to said control means to hold the same against movement by said urging means; and means disposed exteriorly of said body for adjusting said flow-directing means to select another position of movement of said piston in which said fluid directing means becomes operative.

5. In a fluid pressure system a source of fluid pressure; a fluid pressure energy translating device connected in said system, said device having a body with an internal chamber and inlet and outlet ports, the inlet port being connected with said pressure source; a piston disposed for sliding movement in said chamber; valve means carried by said piston for alternately connecting the opposite ends of said chamber with said inlet and outlet ports, respectively; and means for creating back pressure on fluid flowing from one end of said chamber to said outlet, said valve being held in a position to direct fluid from said inlet port to one end of said chamber by said back pressure.

6. In a fluid pressure system, a source of fluid pressure; a fluid pressure energy translating device connected in said system, said device having a body with an internal chamber and inlet and outlet ports, the inlet port being connected with said pressure source; a piston disposed for sliding movement in said chamber; valve means carried by said piston for alternately connecting the opposite ends of said chamber with said inlet and outlet ports, respectively; means for restricting the flow of fluid from one end of said chamber to said outlet, said valve being held in a position to direct fluid from said inlet port to the other end of said chamber by the back pressure caused by the restricted flow; and means for moving said valve to a position to direct fluid from said inlet port to the first-mentioned end of said chamber when the back pressure falls.

7. A fluid pressure energy translating device comprising a body having a chamber and inlet and outlet ports; a piston disposed for sliding movement in said chamber, said piston having passages communicating with said inlet port and the opposite ends of said chamber; a shuttle valve disposed for movement in said piston between a pair of positions wherein the inlet and outlet ports are alternately connected with the ends of said chamber; means operative when said piston reaches a predetermined position to direct fluid under pressure against said shuttle valve to move the same from one position to another to change the direction of movement of said piston, said means being rendered inoperative upon initial movement of said piston in the new direction, and means for utilizing a portion of the fluid being exhausted from said chamber to retain said shuttle valve in the latter position after said first-mentioned means becomes inoperative.

8. In a fluid pressure system, a source of fluid pressure; a body having a chamber connected with said pressure source; piston means disposed for sliding movement in said chamber; flow control means carried by said piston; means tending to urge said flow control means to a position to direct fluid from said pressure source to one end of said chamber to cause said piston means to move toward the opposite end; and means operative when said piston means reaches a predetermined position to direct fluid from said pressure source against said flow control means to move the same in opposition to said urging means to a position to direct fluid from said pressure source to the second end of said chamber to cause said piston to move in the opposite direction and displace fluid from the first end of said chamber, said flow control means being retained in the latter position by a portion of the fluid being displaced after initial movement of said piston.

9. A fluid pressure energy translating device comprising a body member having a chamber and inlet and outlet ports; a piston member disposed for sliding movement in said chamber; flow control means disposed in said piston member; means normally urging said control means toward a position to connect said inlet port and one end of said chamber; means for applying fluid pressure to said flow control means to move the same in opposition to said urging means to another position wherein said inlet port is connected to the opposite end of said chamber while the first end is connected with the outlet port; means in said piston to restrict fluid flow from the first end of said chamber to said outlet to create a back pressure; and passage means for directing fluid at such back pressure to said flow control member to retain the same in said second position as long as fluid is flowing from the first end of said chamber to said outlet.

10. A fluid pressure energy translating device comprising a body having a chamber and inlet and outlet ports; a piston disposed for sliding movement in said chamber, said piston having passages communicating with said inlet port and the opposite ends of said chamber; a shuttle valve disposed for movement in said piston, said shuttle valve having grooves and passages operative when said shuttle valve is in different positions to connect said inlet and outlet ports with opposite ends of said chamber; a spring normally urging said shuttle valve toward a position to connect one end of said chamber with said inlet and the opposite end with said outlet; valve means formed with said piston for directing fluid from said inlet port against said shuttle valve to move the same in opposition to said spring to a position wherein the connections between the ends of said chamber and said inlet and outlet ports are reversed; and means for restricting the flow of fluid between the outlet port and the end of the chamber connected therewith in the latter position of said shuttle valve to create a back pressure, said back pressure serving to retain said shuttle valve against movement by said spring.

11. A fluid pressure energy translating device comprising a body having a pair of communicating chambers and inlet and outlet ports leading to and from said chambers; a piston disposed for sliding movement in one chamber, said piston having an extension projecting into the second chamber and restricting communication between said chambers, said piston and extension being hollow and having passages connecting the interior thereof with the inlet and outlet ports and the ends of the first chamber; and a shuttle valve slidably disposed in said piston and extension, said shuttle valve being movable between two positions and having passages cooperating with the passages in said piston to alternately connect each end of the first chamber with said inlet and outlet ports, said shuttle valve also having a passage for directing a part of the fluid flowing from one end of said first chamber to said outlet port against said shuttle valve to retain the same in one of said two positions during movement of said piston in one direction.

12. A fluid pressure energy translating device comprising a body having a pair of communicating chambers and inlet and outlet ports leading to and from said chambers; a piston disposed for sliding movement in one chamber, said piston having an extension projecting into the second chamber and restricting communication between said chambers, said piston and extension being hollow and having passages connecting the interior thereof with the inlet and outlet ports and the ends of the first chamber; a shuttle valve slidably disposed in said piston and extension, said shuttle valve being movable between two positions and having passages cooperating with those in said piston to alternately connect each end of the first chamber with said inlet and outlet ports; and spring means tending to hold said shuttle valve in one of said two positions, said shuttle valve also having a passage for directing a part of the fluid flowing from one end of said first chamber to said outlet port against said shuttle valve to resist movement thereof by said spring during movement of said piston in one direction.

13. A fluid pressure energy translating device comprising a body having a pair of communicating chambers and inlet and outlet ports leading to and from said chambers; a piston disposed for sliding movement in one chamber, said piston having an extension projecting into the second chamber and restricting communication between said chamber, said piston and extension being hollow and having passages connecting the interior thereof with the inlet and outlet ports and the ends of the first chamber; and a shuttle valve slidably disposed in said piston and extension, said shuttle valve being movable between two positions and having passages cooperating with those in said piston to alternately connect each end of the first chamber with said inlet and outlet ports; spring means tending to hold said shuttle valve in one of said two positions, and valve means for directing fluid from said inlet port against said shuttle valve when said piston reaches a predetermined point to move said shuttle valve to the other position in opposition to said spring, said shuttle having a passage for directing a part of the fluid flowing from one end of said first chamber to said outlet port against said shuttle valve to retain the same in the latter position during movement of said piston in one direction.

14. A fluid pressure energy translating device comprising a body having an internal chamber and inlet and outlet ports; piston means disposed for movement in said chamber, said piston having an internal chamber and passages extending therefrom to the inlet and outlet ports and the ends of said chamber; a shuttle valve disposed for movement in said piston to alternately connect passages leading to the ends of said chamber with said inlet and outlet ports whereby said piston will be caused to reciprocate in said chamber; means operative when said piston has reached predetermined points of travel in either direction to gradually diminish the flow of fluid from the end of the chamber toward which the piston is moving; valve means for directing fluid at inlet port pressure against said shuttle valve to move the same to a position to connect one end of said body chamber with said inlet and the other end with said outlet; and means for moving said shuttle valve to another position to reverse the inlet, outlet and chamber end connections when fluid flow from one end of the body chamber to said outlet port is discontinued.

15. A fluid pressure energy translating device comprising a body having an internal chamber and inlet and outlet ports; piston means disposed for reciprocation in said chamber, said piston and body having fluid passages formed therein; valve means operative to connect certain of said passages to alternately direct fluid under pressure from said inlet port to the ends of said chamber to cause the reciprocation of said piston, said valve means also directing fluid from either end of said chamber to said outlet when the opposite end is connected with said inlet; means cooperating with said valve means to gradually decrease fluid flow from the end of the chamber toward which the piston is moving when the piston nears that end; and means operative when said piston is moving in a certain direction for actuating said valve means to reverse the direction of movement of said piston when fluid flow from the chamber is discontinued due to the stoppage of said piston from any cause.

16. A fluid pressure energy translating device comprising a body having an internal chamber and inlet and outlet ports; piston means disposed for reciprocation in said chamber, said piston and body having fluid passages formed therein; valve means operative to connect certain of said passages to alternately direct fluid under pressure from said inlet port to the ends of said chamber to cause the reciprocation of said piston, said valve means also directing fluid from either end of said chamber to said outlet when the opposite end is connected with said inlet; means in said body for gradually decreasing fluid flow from the end of the chamber toward which said piston is moving when the piston nears that end; and means for actuating said valve means to reverse the direction of movement of said piston when fluid flow from the chamber is discontinued when said piston stops at any point in its stroke when moving in a certain direction.

17. A fluid pressure energy translating device comprising a body having an internal chamber and inlet and outlet ports; piston means disposed for reciprocation in said chamber, said piston and body having fluid passages formed therein; valve means operative to connect certain of said passages to alternately direct fluid under pressure from said inlet port to the ends of said chamber to cause the reciprocation of said piston, said valve means also directing fluid from either end of said chamber to said outlet when the opposite end is connected with said inlet; means in said body for gradually decreasing fluid flow from one end of said chamber when said piston nears said end; means for actuating said valve means to reverse the direction of movement of said piston when fluid flow from said chamber end is discontinued; and means for adjusting said flow decreasing and said valve actuating means.

18. A fluid pressure energy translating device comprising a body having an internal chamber and inlet and outlet ports; piston means disposed for reciprocation in said chamber, said piston and body having fluid passages formed therein; valve means operative to connect certain of said passages to alternatively direct fluid under pressure from said inlet port to the ends of said chamber to cause the reciprocation of said piston, said valve means also directing fluid from either end of said chamber to said outlet when the opposite end is connected with said inlet; means in said body for gradually decreasing fluid flow from one end of said chamber when said piston nears said end; means for actuating said valve means to reverse the direction of movement of said piston when fluid flow from said chamber end is discontinued; and means for simultaneously adjusting said flow decreasing means and said valve actuating means to vary the length of travel of said piston.

19. In a hydraulic system, a source of fluid pressure; a fluid pressure energy translating device connected in said system, said device having a body with inlet and outlet ports and an internal chamber; a piston disposed for sliding movement in said chamber; valve means carried by said piston and movable relative thereto, means for utilizing fluid flowing from one end of said chamber to retain said valve means in a position to direct fluid under pressure to the other end of said chamber whereby said piston will be moved toward said one end of said chamber.

20. In a hydraulic system, a source of fluid pressure; a fluid pressure energy translating device connected in said system, said device having a body with inlet and outlet ports and an internal chamber; a piston disposed for sliding movement in said chamber; valve means carried by said piston and movable relative thereto; means for utilizing fluid flowing from one end of said chamber to retain said valve means in a position to direct fluid under pressure to the other end of said chamber whereby said piston will be moved toward said one end of said chamber; and means for moving said valve to a second position, upon the stoppage of fluid flow from said one end of said chamber, to direct fluid from said other end of said chamber to said outlet port whereby fluid from said inlet port will move said piston toward said other end of said chamber.

21. In a fluid motor, means forming a piston chamber; piston means movably disposed in said chamber; valve means supported by said piston for controlling the direction of movement thereof; means normally tending to maintain said valve means in a certain position to cause movement of said piston in one direction; means for momentarily applying fluid pressure to said valve means to move the same from said certain position to a second position to cause movement of said piston in the other direction; and means for utilizing fluid being exhausted from said motor while said piston is moving in said other direction to retain said valve means in said second position, said valve-maintaining means becoming effective to return said valve to said certain position when exhaust flow of fluid is discontinued irrespective of the distance traveled by said piston in said other direction.

22. In a fluid motor, means forming a piston chamber; piston means movably disposed in said chamber; valve means movably supported by and cooperating with said piston to control the direction of movement thereof; means yieldably urging said valve means toward a predetermined position wherein said piston is caused to move in a certain direction; means operative when said piston reaches a predetermined point when moving in such direction to momentarily apply fluid pressure to said valve to move the same in opposition to said urging means to a second position wherein said piston is caused to move in the other direction; means for utilizing fluid being displaced by said piston while moving in the latter direction to retain said valve means in said second position, said urging means returning said valve to said predetermined position when said piston ceases to displace fluid irrespective of the distance traveled thereby in said latter direction; and means for trapping a cushioning body of fluid between said piston and the ends of said piston chamber when said piston makes a full stroke in either direction.

23. A fluid motor comprising a body formed with a chamber and inlet and outlet ports; piston means disposed for reciprocation in said chamber; valve means carried by said piston, said valve means being operative to control fluid flow from said inlet to the chamber at opposite ends of said piston to effect the reciprocation thereof; means tending to urge said valve means to a position to direct fluid from said inlet to a predetermined end of said chamber; a second means for applying fluid from said source to said valve means to move the same in opposition to said urging means; and a third means operative after said valve has been moved in opposition to said urging means to utilize fluid being exhausted from said chamber to retain said valve against movement by said urging means.

CECIL E. ADAMS.

REFERENCES CITED

The following references are of record in the file of this patent:

UNITED STATES PATENTS

| Number | Name | Date |
|---|---|---|
| 397,958 | Barth | Feb. 19, 1889 |
| 606,844 | Rhodes | July 5, 1898 |
| 897,346 | Breitenstein | Sept. 1, 1908 |
| 1,031,340 | Howard | July 2, 1912 |
| 1,058,718 | Brigger | Apr. 15, 1913 |
| 1,142,551 | Burnhart | June 8, 1915 |
| 2,276,783 | Kennedy et al. | Mar. 17, 1942 |
| 2,348,243 | Cole | May 9, 1944 |